United States Patent [19]

Aldenhoven

[11] 4,437,626

[45] Mar. 20, 1984

[54] MECHANISM RESPONSIVE TO ROTATION STOPPAGE, AND TAPE RECORDER WITH SUCH MECHANISM

[75] Inventor: Ghislanus M. A. M. Aldenhoven, Eindhoven, Netherlands

[73] Assignee: U.S. Philips Corporation, New York N.Y.

[21] Appl. No.: 340,906

[22] Filed: Jan. 20, 1982

[30] Foreign Application Priority Data

Feb. 16, 1981 [NL] Netherlands .................. 8100731

[51] Int. Cl.³ .................. B65H 59/38; G03B 1/04; G11B 15/32
[52] U.S. Cl. .................. 242/186; 242/201; 360/74.2
[58] Field of Search .................. 242/186, 189–190, 242/201, 204; 360/71, 74.1, 74.2

[56] References Cited

U.S. PATENT DOCUMENTS

| | | | |
|---|---|---|---|
| 4,010,918 | 3/1977 | Kato .................. | 242/191 |
| 4,210,944 | 7/1980 | Fushimi et al. .................. | 360/74.2 |
| 4,283,808 | 12/1980 | Tomita .................. | 360/74.2 |
| 4,351,498 | 9/1982 | Iwata et al. .................. | 242/204 |

Primary Examiner—Leonard D. Christian
Attorney, Agent, or Firm—David R. Treacy

[57] ABSTRACT

An actuating mechanism which responds to the stoppage of rotation of a component, and a tape recorder including such a mechanism. During apparatus operation a reciprocating movement is imparted to a lever. Rotation of the component causes a frictionally coupled actuating element to press at least one cam against the lever with a biasing torque, the reciprocating movement causing the lever to slide along the cam. The lever also slides along a guide element so as to define a path of lever actuating portion movement. Upon stopping of the component rotation, the biasing torque is removed, and the lever pivots to follow a second path of actuating portion movement defined by the guide element. A tape recorder includes such a mechanism with an actuating element that provides a same torque to the lever for either direction of component rotation, and quickly unlatches control buttons if the component rotation stops.

25 Claims, 11 Drawing Figures

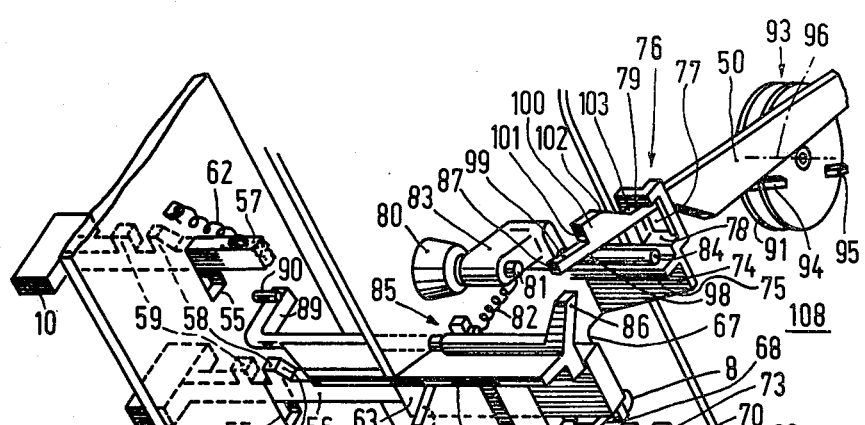

MECHANISM RESPONSIVE TO ROTATION STOPPAGE, AND TAPE RECORDER WITH SUCH MECHANISM

BACKGROUND OF THE INVENTION

The invention relates to an apparatus, in particular a tape recording and/or playback apparatus, having a drive system and a component which is rotated by the drive system, and further including a device for changing over the drive system when the component stops rotating; and more particularly to such a device which comprises an actuating element which is connected to the component by a function coupling and which device further comprises a lever which is pivotally connected to an eccentric mechanism which, during operation, is continuously driven by the drive system so that the lever. During operation, thus performs a reciprocating swinging movement, during the reciprocating movement an actuating portion of the lever follows a first path when the component rotates under a torque exerted by the actuating element, and follows a second path when the component is stationary in the absence of the torque, a switching element, which changes over the drive system, being actuated by movement of the actuating portion of the lever along the second path only.

An apparatus of this type is known from U.S. Pat. No. 4,190,215. In this known apparatus the device for changing over the drive system comprises a relatively large number of components, so that the resulting comparatively high manufacturing cost makes this known device less suitable for use in mass-manufactured apparatus.

SUMMARY OF THE INVENTION

It is an object of the invention to provide an apparatus of the type described above, in which the device for changing over the drive system is capable of providing comparatively great switching forces despite its minimal number of components.

According to the invention, this object is achieved in that the actuating element comprises at least one cam, along which the lever, in the first path, makes a sliding movement during reciprocation, and in that there is provided a guide element for guiding the lever in the first or the second path during the reciprocating movement.

Thus, a reliable device for changing over the drive system is obtained having a minimum number of components. The presence of the cam, which continuously performs a sliding movement during the reciprocation of the lever, ensures that rotation of the component is sensed continuously, so that when the component does not rotate, the switching element can be actuated rapidly and effectively. The direct manner of driving the lever moreover ensures that a comparatively great force can be exerted during switching off. Thus, in the apparatus in accordance with the invention, components which require a comparatively great switching force, such as mechanically operated actuating buttons, can also be switched off or over. Furthermore, the presence of the guide element precludes inadvertent actuation of the switching element during normal rotation of the component and, owing to the possibility of guiding the actuating portion in the second path by means of the guide element, ensures an effective actuation of the switching element when the component is stationary.

In a preferred embodiment of the apparatus in accordance with the invention the lever comprises a profiled portion on one side, which profiled portion cooperates with the guide element in the first path of the actuating portion of the lever. Owing to these steps at least a part of the first path will be situated at a comparatively short distance from the second path, so that when the component is stationary in the absence of the torque, the actuating portion of the lever rapidly moves into the second path and actuates the switching element.

In this respect it is of advantage if the side of the lever which is remote from the profiled portion is substantially straight over at least the portion which cooperates with the guide element. Owing to the straight shape the lever is rapidly and effectively guided to the switching element in the second path.

A suitable embodiment of an apparatus in accordance with the invention is characterized in that the guide element is provided with an opening for the passage of the lever, the lever being guided by opposite walls or said opening. As the lever is enclosed between the two opposite walls, it is ensured that the actuating portion of the lever accurately follows the first or the second path.

In connection with the foregoing it is found to be favourable if the guide element is movable between two positions and, in the first position, the actuating portion of the lever is guided in the first or the second path and, in the second position, the actuating portion of the lever is guided in a third path, in which third path the actuating portion of the lever does not actuate the switching element. By making the guide element movable, it is possible to position the relevant guide wall of the guide element in such a way that the actuating portion of the lever exclusively follows the third path and is not capable of reaching the second path, which precludes an inadvertent change-over of the drive system. This prevents an inadvertent actuation of the switching element when no or an inadequate torque is exerted on the lever, for example if the apparatus is set to an inoperative position, such as a pause position.

In this respect a suitable embodiment of an apparatus in accordance with the invention is characterized in that there is provided a positioning element which co-operates with the lever, which element is also movable between two positions and, by coupling to the guide element during the movement of the guide element to the second position, can also be moved from a first to a second position, and which positioning element is connected to the frame of the apparatus via a friction coupling. The positioning element then ensures that, after the movement of the guide element from the second position to the first position, the actuating portion of the lever is forced to follow the first path for some time. If after starting of the component the actuating element does not yet exert a torque or a sufficient torque on the lever, this prevents the actuating portion of the lever from moving into the second path and thereby erroneously actuating the switching element.

In this respect it is also of advantage if there is provided a latching element which latches the guide element in the first position, the latching element being engageable with the switching element so that upon actuation of the switching element the guide element is unlatched and a movement into the second position is possible. This ensures that after the movement into the first position the guide element retains this position, whilst the switching element can provide unlatching.

A further preferred embodiment of an apparatus in accordance with the invention is characterized in that the actuating element comprises two cams, the actuating element is pivotable, and a first cam is situated at a greater distance than a second cam from the pivotal axis of the actuating element. When the component rotates this enables a torque to be exerted on the lever in a first direction and in a second direction. Then the problem occurs that a first cam is situated at a greater distance than a second cam from the axis about which the lever is pivotable, whilst it is necessary to exert the same torque on the lever in both directions of rotation. By arranging the first cam at a greater distance than the second cam from the pivotal axis, a substantially equal torque can be obtained in both directions of rotation.

The invention will now be described in more detail with reference to the drawings, which show an embodiment to which the invention is not limited.

BRIEF DESCRIPTION OF THE DRAWINGS

FIG. 4a is a rear perspective view of parts of the apparatus which are relevent to the invention, the interior mechanism of the apparatus in this view being in the position shown in FIG. 2.

FIG. 4b schematically represents the path followed by the actuating portion of the lever when the interior mechanism of the apparatus is in the position shown in FIG. 4a.

FIG. 5a is a perspective view similar to that of FIG. 4a, showing the interior mechanism of the apparatus set to the starting position.

FIG. 5b schematically represents the path followed by the actuating portion of the lever when the interior mechanism of the apparatus is in the position shown in FIG. 5a.

FIG. 6a is a perspective view similar to that of FIG. 4a, showing the interior mechanism of the apparatus in a normal operating position.

FIG. 6b schematically represents the path followed by the actuating portion of the lever when the interior mechanism of the apparatus is in the position shown in FIG. 6a.

FIG. 7a is a perspective view similar to that shown in FIG. 4a, showing the interior mechanism of the apparatus when the rotatable component has just stopped.

FIG. 7b schematically represents the path followed by the actuating portion of the lever when the interior mechanism of the apparatus is in the position shown in FIG. 7a.

DESCRIPTION OF THE PREFERRED EMBODIMENTS

Figure 1:
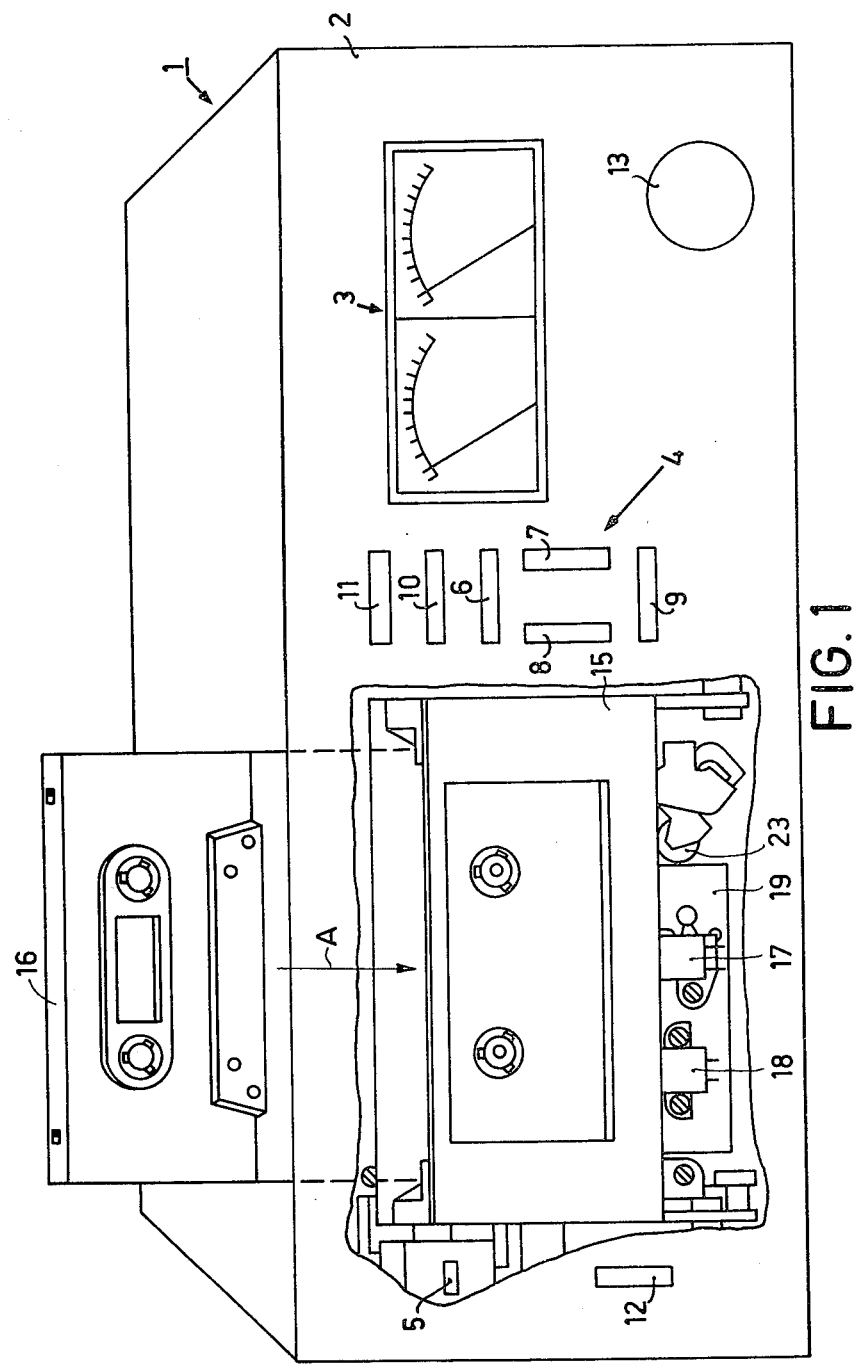
FIG. 1 is a front view of an apparatus in accordance with the invention, which view also shows a part of the interior mechanism of the apparatus.

The apparatus shown in FIG. 1 comprises a housing 1 with a front panel 2, on which a number of elements for actuating the apparatus are located. These parts include meters 3, actuating buttons 4 and an eject button 5. The actuating buttons 4 comprise a play button 6, a fast-forward button 7, a fast-rewind button 8, a stop button 9, a pause button 10, and a recording button 11. Furthermore, a switch 12 is arranged on the front panel 2 by means of which switch the mains voltage can be switched on and off. By means of a rotary knob 13 the recording level of the signals to be recorded onto magnetic tape can be controlled, which level can be read on the meters 3. Further controls present on the front panel 2 are not shown for the sake of clarity.

Figure 2:
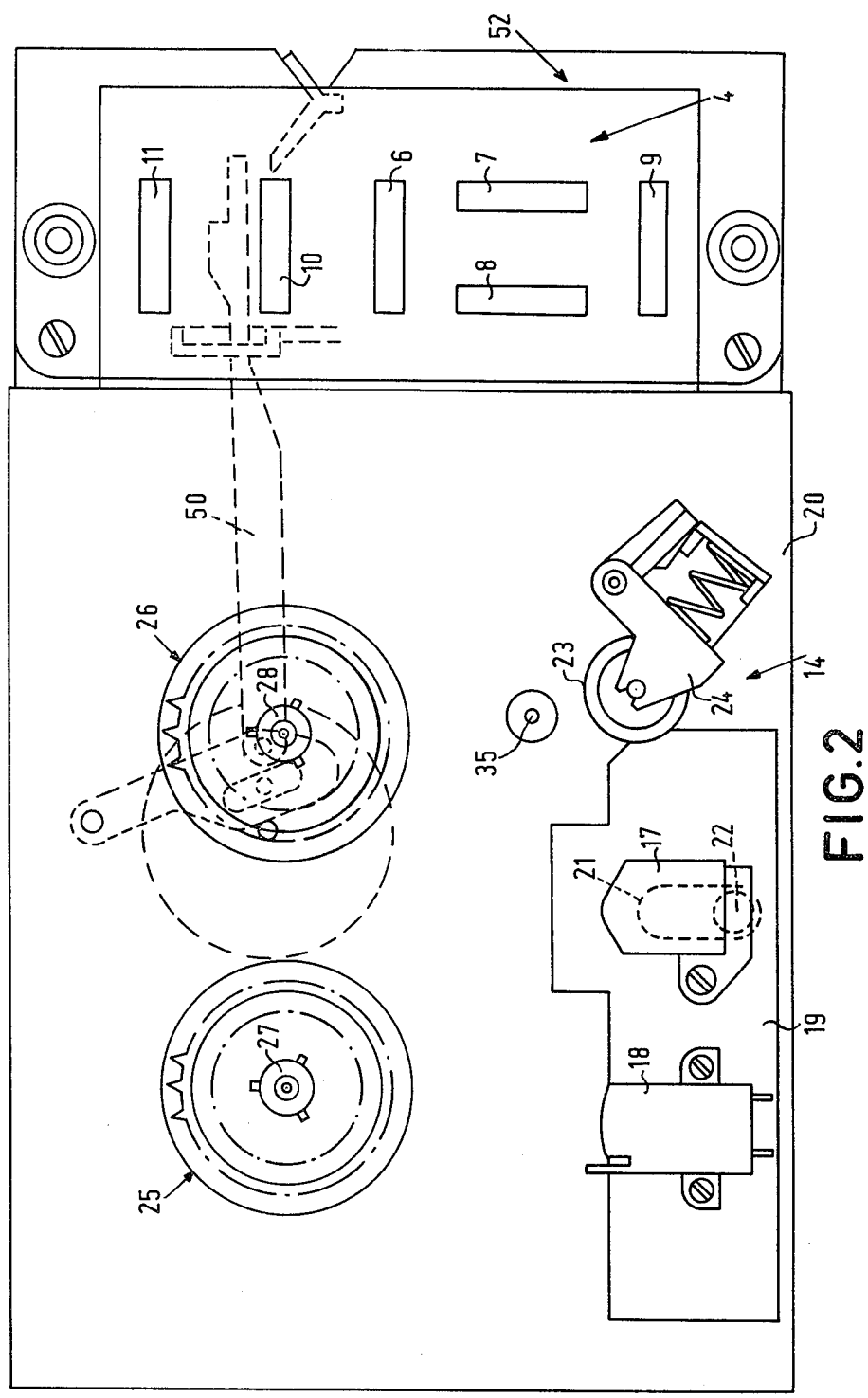
FIG. 2 is a front elevation, on an enlarged scale, of the interior mechanism of the apparatus shown in FIG. 1 a number of components of the apparatus being omitted for the sake of clarity and the interior mechanism of the apparatus being shown in an inoperative position.
Figure 3:
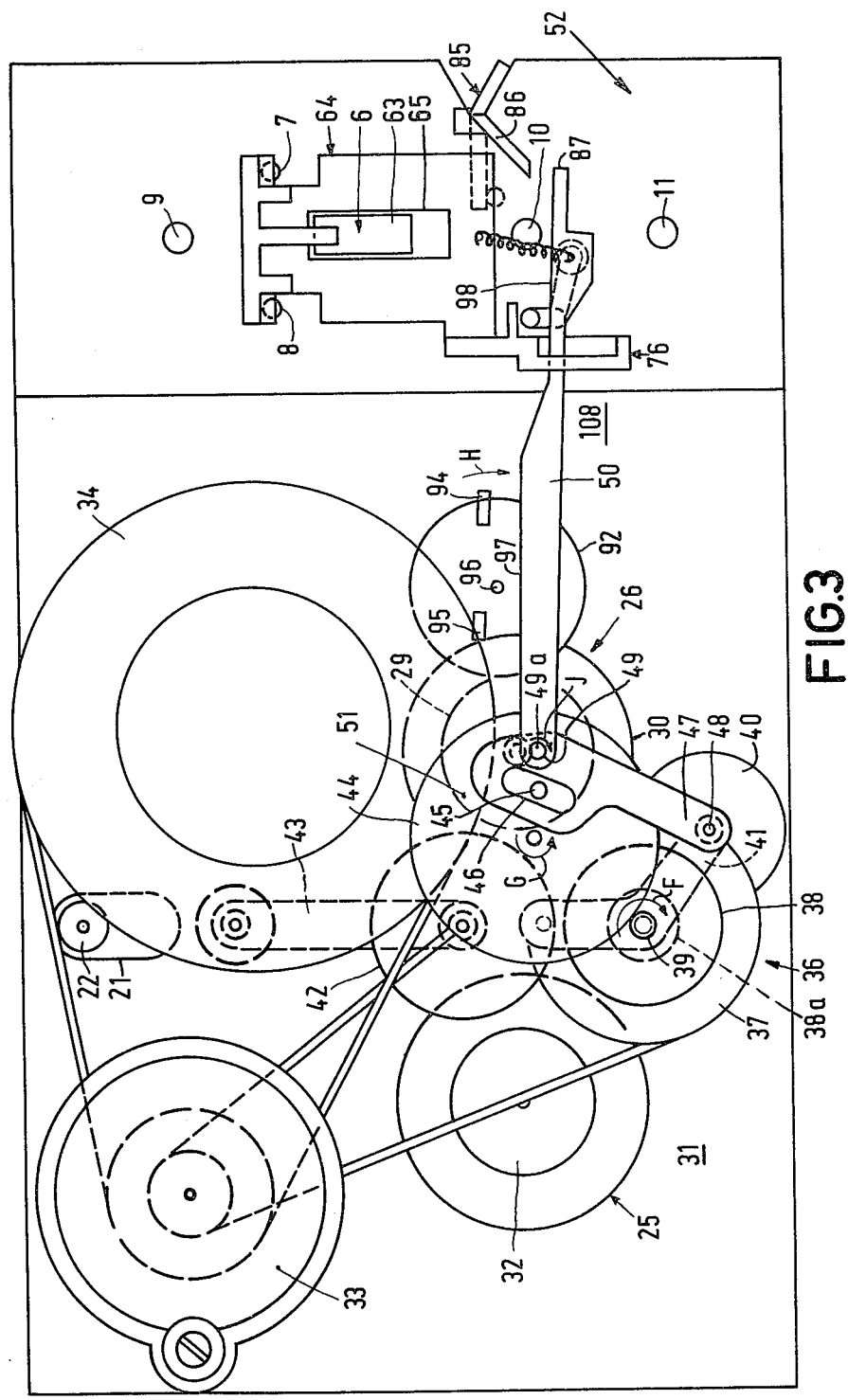
FIG. 3 is an inverted rear view of the interior mechanism of the apparatus in the position shown in FIG. 2, a number of components again being omitted for the sake of clarity.

The part of the interior mechanism of the apparatus shown in FIGS. 2 and 3 comprises a tape deck 14, which is situated inside the housing 1. A cassette holder 15 (signal 1) is pivotable from the tape deck 14 to a position outside the front panel 2 as shown in FIG. 1. In this way the cassette holder 15 can receive a magnetic tape cassette 16, shown in FIG. 1, by inserting the cassette in the direction of the arrow A, as shown in FIG. 1.

At the side of the holder 15 which is remote from the insertion opening there are arranged on the tape deck 14 a combined magnetic recording/playback head 17 and a magnetic erase head 18, (shown in FIGS. 1 and 2), which magnetic heads are located on a common head slide 19. The head slide 19 is arranged to be slidable on a frame plate 20 which extends parallel to the front panel 2. For guiding the head slide 19 a slot 21 is formed in the frame plate 20, and for moving the head slide a pin 22, secured to the side of the head slide 20 facing the frame plate 20, passes through the slot 21. Furthermore, a pressure roller 23 is pivotably mounted on the frame plate 20 by means of a pressure-roller bracket 24. For a detailed description of the construction and actuation of the head slide 19, the pressure roller 23 and the other parts which are relevant to the tape deck 14, reference is made to Netherlands patent application 8006257 filed on Nov. 17, 1980, to which U.S. patent application Ser. No. 317,680 filed Nov. 2, 1981 corresponds. This patent application is hereby incorporated in the present specification by reference. As is also shown in FIG. 2, the frame plate 20 carries two reel discs 25 and 26 which, at the front of the frame plate 20, carry winding spindles 27 and 28 which are engageable with hubs in the cassette 16, which hubs serve for winding or unwinding the magnetic tape. Between the reel disc 26 and the winding spindle 28 there is arranged a friction coupling, the winding spindle 28 being rigidly connected to a gear-wheel 29 (see FIG. 3). The reel disc 26 is rigidly connected to a gear-wheel 30, which is coaxial with the gear-wheel 29. Together with a motor 33 and a number of wheels to be described hereinafter, the gear-wheels 29 and 30 form part of a drive system 31 of the apparatus. The reel disc 25 is rigidly connected to a gear-wheel 32 located at the rear of the frame plate 20.

At the rear of the frame plate 20 is arranged the drive motor 33, which is coupled to a flywheel 34 by means of a belt transmission. The flywheel 34 is rigidly connected to a capstan 35 located at the port of the frame plate 20. The motor 33 is further coupled to a central drive wheel 36 by means of a belt. The central drive wheel 36 comprises a pulley 37, gear-wheels 38 and 38a, and a gear-wheel 39 of comparatively small diameter. The pulley 37 and the gear-wheel 39 are rigidly connected to each other. The gear-wheel 38 is rigidly connected to the gear-wheel 38a. A friction clutch, not shown, is arranged in the connection between the assembly comprising the gear-wheels 38, 38a and the assembly comprising the pulley 37 and the gear-wheel 39. The teeth of the gear-wheel 38a constantly mesh with the teeth of a normal-mode idler wheel 40, which is mounted on the end of a normal-mode idler arm 41. The teeth of the gear-wheel 38 are constantly in mesh with the teeth of a fast-mode idler wheel 42, which is arranged on a fast-mode idler arm 43. By pivoting the fast-mode idler arm 43 the fast-mode idler wheel 42 is engageable with the gear-wheel 29 or 32 respectively, while in the inoperative position of the tape deck shown in FIG. 3 the fast-mode idler wheel 42 is in an inoperative intermediate position. By pivoting the normal mode idler arm 41 the normal-mode idler wheel 40 is engageable with the gear-wheel 30, whose diameter is greater than that of the gear-wheel 29, so that the normal-mode idler wheel can occupy an operative position. In the inoperative position, shown in FIG. 3, the normal-mode idler wheel is disengaged from the gear-wheel 30. Both the normal-mode idler wheel and the fast-mode idler wheel are actuated through the buttons 4 by means of a switching mechanism, not shown, and are thereby pivoted into an operative or inoperative position respectively. The normal-mode idler wheel and the fast-mode idler wheel form part of the drive system 31 of the tape deck 14.

Figures 4A, 4B:
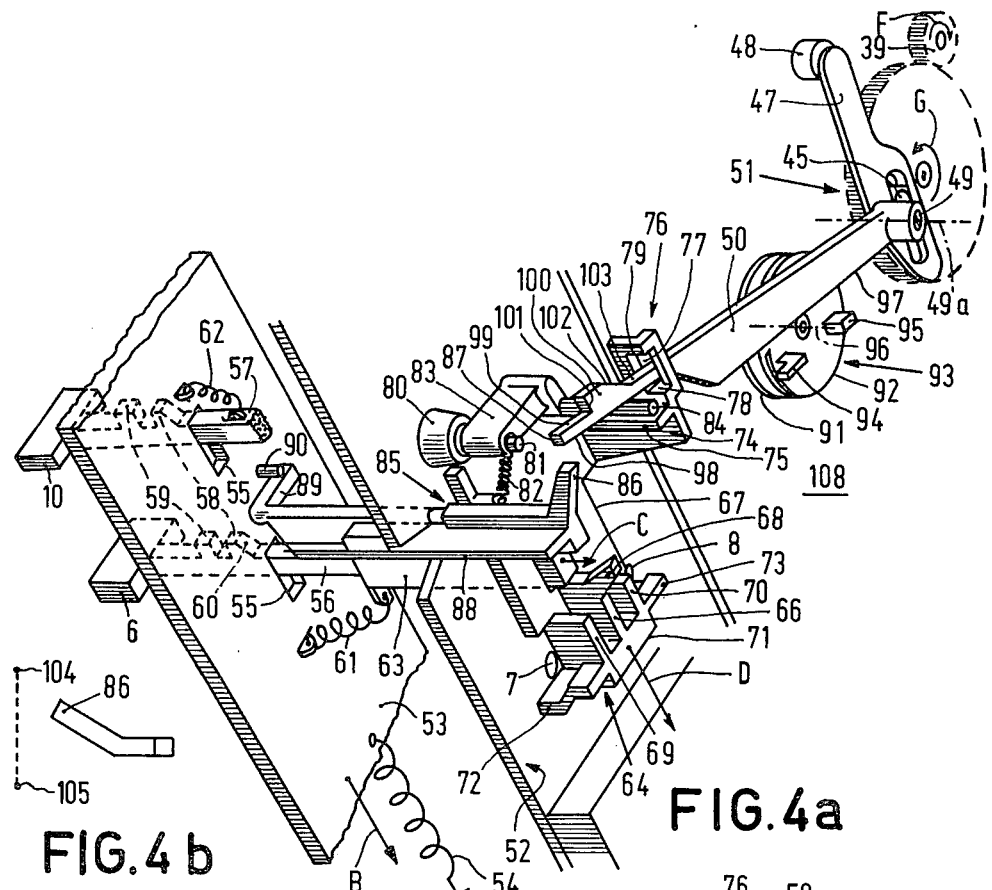

The teeth of the gear-wheel 39 mesh with the teeth of a comparatively large gear-wheel 44 (see FIGS. 3 and 4a). As the drive to the gear-wheel 39 from the motor 33 does not include a friction coupling, the gear-wheel 44 is also directly coupled to the motor 33. On the gear-wheel 44 a pin 45 is arranged, which pin extends through a slot 46 formed in a lever 47. The lever 47 is pivotable about a spindle 48, which extends perpendicularly to the frame plate 20. Near the slot 46 a pin 49 is mounted on the lever 47, which pin provides a pivotal axis 49a for a lever 50. The gear-wheel 44, the pin 45 and the lever 47 together constitute an eccentric mechanism 51, which is continuously driven by the gear-wheel 44 during operation. Thus, at least after the switch 12 has been switched on, the lever 50 performs a reciprocating swinging movement, during which swinging movement the lever 50 pivots about the pivotal axis 49a.

As is shown in FIGS. 2 to 4a, an auxiliary frame plate 52 is arranged adjacent the frame plate 20, which auxiliary frame plate is suitably connected to the plate 20 by means of screws. The auxiliary frame plate 52 carries the actuating buttons 4 on its upper side. On its rear side the auxiliary frame plate 52 constitutes a guide for the free ends of the actuating buttons 4. As is schematically represented in FIGS. 4a, 5a, 6a and 7a, a latching element, constituted by a latching plate 53, is slidable relative to the auxiliary frame plate 52 in a direction perpendicular to the direction of movement of the actuating buttons 4, a tension spring 54 exerting a force on the plate 53 in the direction of the arrow B in FIG. 4a. In the plate 53 a plurality of rectangular openings 55 is formed, through which the rod 56 of the play button 6 and the rod 57 of the pause button 10, among others, extend. For the sake of clarity, the other buttons are not shown. On the rod 56 are formed two projections 58 and 59, the projection 58 being provided with a surface 60 which is inclined downwardly in the direction of the free end of the rod 56. By means of the surface 60 the button 6, when it is moved in the direction of the arrow C, is capable of moving the latching plate 53 in the direction opposite to the arrow B.

Figures 5A, 5B:
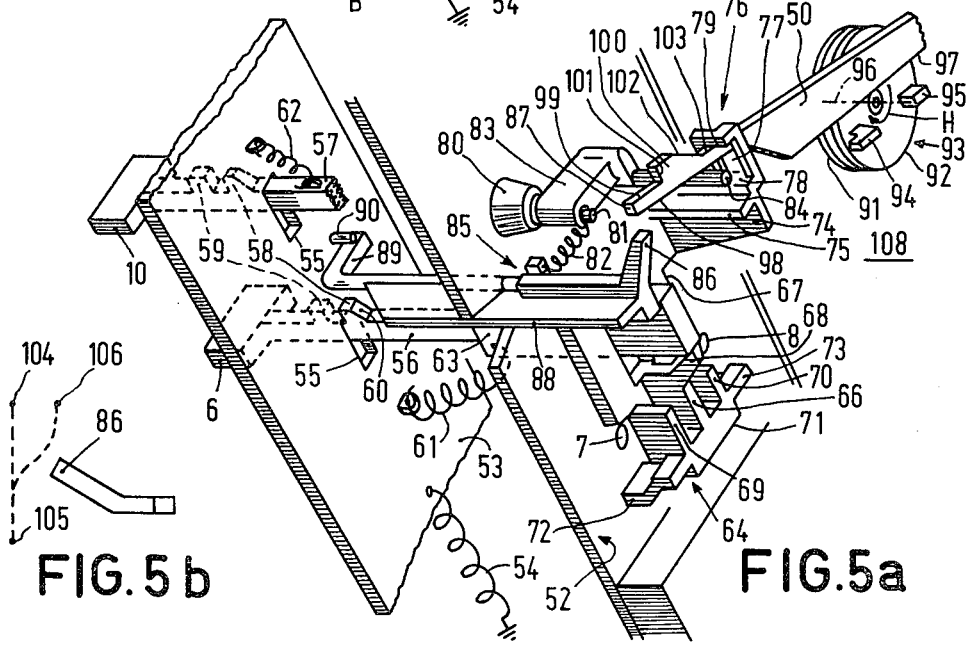

After the projection 58 has passed the plate 53, the plate 53 returns in the direction of the arrow B owing to the force exerted by the spring 54, so that the portion of the plate 53 adjacent the opening 55 in the plate is positioned between the projections 58 and 59. This position is shown in FIG. 5a. In this position the actuating button 6 is consequently latched. The rod 57 of the pause button 10 is also provided with projections 58 and 59. Under the influence of a spring 61, which urges the button 6 in a direction opposite to the arrow C, the play button 6 is moved back in a direction opposite to the arrow C when the pause button 10 is depressed and the plate 53 thereby moved in the direction opposite to the arrow B, so that the button 6 is unlatched and returns to the neutral rest position. In a similar manner a spring 62 urges the pause button 10 to the neutral position.

The free end of the rod 56 comprises a thickened portion 63, which extends through the auxiliary frame plate 52 to some distance beyond the rear side of the auxiliary frame plate 52. On this side of the auxiliary frame plate 52 there is arranged a slide 64, which is rectilinearly guided on the auxiliary frame plate from the neutral position shown in FIG. 4a in a direction of the arrow D into the position shown in FIG. 5a. It is to be noted that the direction D, which is parallel to the arrow B, is perpendicular to the top surface of the housing 1.

The slide 64 is formed with a slot 65 for the passage of the thickened portion 63 of the play button rod 56. Adjoining a short side of the slot 65 the slide 64 comprises a ridge 66 which extends perpendicularly to a base plate 67 of the slide 64. At the side which is remote from the plate 67 the ridge 66 adjoins a finger 68, which extends obliquely upwards relative to the plate 67. The finger 68 is so situated relative to the thickened portion 63 of the play button rod 56 that, as is shown in FIG. 5a, the movement of the thickened portion 63 in the direction of the arrow C in FIG. 4a results in the free end of the portion 63 pressing against the finger 68. Upon the further movement of the button 6 into the latched position the free end of the portion 63 moves the finger 68 and thus the slide 64 in the direction of the arrow D into the position shown in FIG. 5a. Further ridges 69 and 70 are formed on the slide 64 on opposite sides of the ridge 66 and parallel to the ridge 66. The ridges 66, 69 and 70 adjoin a reinforcement rib 71 which extends transversely of said ridges. Near the ridge 69 the rib 71 adjoins a tab 72 having a zigzag shape. A similar tab 73 having a zigzag shape is arranged at the other end of the rib 71. Owing to the presence of the tabs 72 and 73 the slide 64 is also moved from the neutral position shown in FIG. 4a into the position shown in FIG. 5a when the button 7 or 8 is depressed. After depression the buttons 7 and 8 are also latched by the plate 53 in the same way as the button 6. For the sake of clarity only the actuation of the slide 64 by means of the play button 6 will be described hereinafter. It is to be noted that the actuation by means of the buttons 7 and 8 is effected in an identical manner.

At the side facing the tape deck 14 the slide 64 comprises a tab 74, which extends at right angles to the base plate 67 and on which a rib 75 extends perpendiclarly which rib ensures that the tab 74 has the necessary rigidity although the slide 64 is made of a plastics. Adjoining the tab 74 a guide element 76 is arranged on the slide 64, which element is formed with a substantially rectangular opening 77 for the passage of the lever 50. The opening 77 has opposite walls 78 and 79 for guiding the lever during its reciprocating movement. On the auxiliary frame plate 52 is a support 80 in which a pin 81 is rotatably mounted. Connected to the pin 81 near the free end thereof is fixed a tension spring 82 whose end which is remote from the pin 81 is connected to the slide 64. The tension sring 82 tends to move the slide 64 in a direction opposite to the arrow D so that when the button 6 is unlatched from the position shwon in FIG. 5a and returns to the position shown in FIG. 4a, the slide 64 is moved from the position of FIG. 5a to that of FIG. 4a. An arm 83 is pivotable about the pin 81, which arm, at its end which is remote from the pin 81, carries a rod 84 which constitutes a positioning element for the lever 50. Owing to the arrangement of the pin 81 parallel to the pivotal axis 49a the rod 84 can guide the lever 50 over some distance during its reciprocating movement, in order to support the guide element 76. In this respect it is important that the spring 82 exerts a force on the pin 81, so that friction is produced between the pin 81 and the portion of the support 80 which co-operates therewith. Thus, a frictional coupling is obtained in the connection between the rod 84 and the auxiliary frame plate 52.

A switching element 85 also is pivotably arranged in the auxiliary frame plate 52. The switching element 85 comprises a finger 86, which when the slide 64 is in the neutral position cannot be contacted by an actuating portion of the lever 50 at the free end 87 thereof owing to the arrangement of the guide element 76, as can be seen in FIG. 3, during the reciprocating movement of the lever 50. The switching element 85 extends from the finger 86 in the direction of the latching plate 53 and is formed with a rib 88 to make is sufficiently rigid. Near the latching plate 53 the switching element 85 comprises a right-angled arm 89, which in the neutral position shown in FIG. 4a engages with, or is situated at a comparatively short distance from, a projection 90 on the latching plate 53. The pivotal movement of the switching element 85 in a direction indicated by the arrow E in FIG. 7a, which pivotal movement is caused by engagement of the free end 87 of the lever 50 with the finger 86, is such that the latching plate 53 is moved over a suitable distance in a direction opposite to the arrow B to release the latched button 6 and allow it to return to the neutral position.

The gear-wheel 29 drives a gear-wheel 91 (FIG. 4a), which thus also rotates when the winding spindle 28 is in rotation. The gear-wheel 91 is coupled to a disk 92 through a friction coupling, not shown, which disk forms part of an actuating element 93, which by means of a first cam 94 or a second cam 95 each formed by an eccentric projection on the disk 92 can exert a torque on the lever 50. The cams 94 and 95, as is shown in FIG. 3, are so positioned relative to the supporting spindle 96 of the disk 92 that the connecting lines between the axis of the spindle and the sides of the cams 94 and 95 which face one another enclose an obtuse angle of approximately 140° with each other in the embodiment shown. Moreover, as will be described below, it is important that the sides of the cams 94 and 95 which are remote from each other are situated at different radial distances from the axis of the spindle 96. Thus, for the cam 95 the corner point which is most remote from the spindle 96 is situated within the circumference of the disk 92, while for the cam 94 the corner point which is most remote from the spindle is situated outside the disk 91. In the present embodiment the relevant distances from the axis of the spindle 96 are approximately 85% and 125% of the radius of the disk 92. For a correct cooperation with the cams 94 and 95 the lever 50 comprises an edge 97 which, at least at the location of the disk 92, is straight. The edge 97 is situated at a comparatively small distance from the cams 94 and 95 in the neutral position of the lever 50, shown in FIG. 4a. Because this distance is small a comparatively small time is required to bring the cam 94 or 95 into engagement with the edge 97 after the gear-wheel 91 has started to rotate. Adjoining its free end 87 the lever 50 has a further straight edge 98 at the side facing the rod 84. At the opposite side the lever has an edge 99 which extends parallel to the edge 98 from the free end 87 and which adjoins a profiled portion 100, which from the edge 99 comprises a rectangular portion 101 adjoining an inclined portion 102. Adjacent the portion 102, lever 50 comprises an edge 103, which is situated substantially in line with the edge 99.

The operation of the apparatus described in the foregoing is as follows

When the apparatus has been switched on by the actuation of the on-and-off switch 12, and a cassette 16 has been inserted in the cassette holder 15 and the holder 15 closed, the apparatus is ready for use. To set the apparatus in operation the user may actuate one of the actuating buttons 4. Change-over of the switch 12 results in the drive system 31 of the tape deck 14 being started, so that the gear-wheel 39 begins to rotate in the direction of the arrow F in FIGS. 3 and 4a. Owing to this rotation the gear-wheel 44 is rotated continuously in the direction of the arrow G. The eccentric mechanism 51, which is coupled to the gear-wheel 44, converts the rotation in the direction G into a reciprocating swinging movement of the lever 50. Since the buttons 6, 7 or 8 are not yet actuated, the reel discs 25 and 26 are not yet driven. Consequently, the winding spindle 28 is stationary, so that the gear-wheel 91 which is coupled thereto is also stationary. Thus, actuating element 93 with the cams 94 and 95 is still inoperative and no torque is exerted on the lever 50. Since the slide 64 with the guide element 76 occupies the neutral position, shown in FIG. 4a, under the influence of the spring 82, which position is hereinafter referred to as the "second position" of the guide element, and the straight edge 98 of the lever 50 slides along the wall 78 under the influence of the weight of the lever 50, the lever moves between points 104 and 105 in accordance with a substantially straight line during the reciprocating movement, in a manner as shown in FIG. 4b. As can be seen in FIG. 4a, the free end 87 of the lever 50 is consequently situated at some distance from the free end of the finger 86. This ensures that in the second position of the guide element 76, the lever 50 is guided along a path, hereinafter referred to as the "third path" of the lever, in which the lever cannot actuate the switching element 85. In this way it is ensured that in the second position of the guide element 76 the latching plate 53 cannot be shifted. The third path, shown in FIG. 4b, is also obtained if the pause button 10 is depressed, because this button is not engageable with the slide 64 and depression of the button 10 unlatches the guide element 76, due to the button 6 being released, so that the element 76 moves into the second position.

If subsequently the play button 6 is actuated, the slide 64 and the guide element 76 are moved in the direction of the arrow D to the position shown in FIG. 5a, hereinafter referred to as the "first position" of the guide element 76, simultaneously with the latching of the button 6 by the latching plate 53. The size of the opening 77 is selected so that now the edge 103 engages with the wall 79, the rod 84, which was initially positioned against the rib 75, now being clear of said rib. This position of the rod 84 will be referred to hereinafter as the "second position" of the rod. If subsequently owing to the coupling of the gear-wheel 29 with gear-wheel 38, and thus with the motor 33, through the normal-mode idler wheel 40, the winding spindle 28 begins to rotate, the gear-wheel 91 will also be rotated. Owing to the rotation of this component of the apparatus the cam 94 will be rotated in the direction of the edge 97 through the friction coupling between the gear-wheel 91 and the disc 92. Because of the shortness of the distance of the cam 94 from the edge 97 this will happen almost immediately after the winding spindle 28 has started to rotate. Rotational movement of the disk 92 in the direction of the arrow H in FIG. 5a causes the cam 94 to exert a torque on the lever 50, tending to pivot the lever 50 about the pivotal axis 49a in the direction of the arrow J in FIG. 3. As a result of this, the lever 50 is constantly urged against the wall 79 of the opening 77 in the guide element 76 with its edge 103 which is remote from the edge 98. Actuation of the play button 6, however, may not immediately result in a torque being exerted on the lever 50 by the cam 94. The positioning element, constituted by the rod 84, now ensures that in spite of this, the free end 87 cannot actuate the switching element 85. If upon depression of the play button 6 the free end 87 of the lever 50 moves way from the guide element 76, as is shown in FIG. 5b, the free end 87 will first complete the path from point 104 to point 105 as shown in FIG. 5b, because in this situation the rod 84 still occupies the second position as shown in FIG. 5a. Only when the rod 84 returns in the direction of the guide element 76 will it be pivoted into the position shown in FIG. 6a because the profiled portion 100 is guided by the wall 79. Owing to the presence of the profiled portion 100 the free end 87 will move from point 105 to point 106 in FIG. 5b along a curved path. Thus, the rod 84 is capable of guiding the lever for some time in such a way that no undesired actuation of the switching element 85 is possible.

As is shown in FIGS. 6a and 6b, the free end 87 of the lever 50 follows a curved path between the points 105 and 106 during normal operation. This first path of the lever is a result of the co-operation between the wall 79 and the edge 99, the profiled portion 100 and the edge 103. During this movement the edge 97 of the lever 50 performs a sliding movement along the cam 94. If the winding spindle 28 stops because the magnetic tape stops, the component 91 will also stop. This may happen because the end of the magnetic tape wound onto the winding spindle 28 is reached. When the winding spindle 28 stops, it is important that the lever 50 continues the swinging movement. For this it is necessary that the motor 33 and the gear-wheel 44 keep rotating freely. This is possible owing to the presence of the friction coupling between the pulley 37 and the gear-wheels 38 and 38a. The friction coupling between the winding spindle 28 and the reel disc 26 also contributes to the continuous rotation of the motor in the normal mode of the tape deck. Among other functions, it is now desired to disengage the drive of the winding spindle while the motor 33 keeps rotating. This is achieved by means of the actuating element 93, the lever 50, the slide 64 and the switching element 85. Together these parts of the apparatus constitute a device 108 for changing over the drive system when the component 91 is stationary.

Switching is effected as illustrated in FIG. 7a. Owing to the disappearance of the torque exerted on the lever 50 by the cam 94, the edge 98 of the lever 50 engages the wall 78 of the opening 77 in the guide element 76 under the weight of the lever. As a result of this, the lever will follow a second path, namely that shown in FIG. 7b, from point 106 of the first path in the direction of point 107 along a substantially straight line. When following said second path the free end 87 abuts the end of the finger 86, so that the switching element 85 is actuated and is pivoted in the direction of the arrow E in FIG. 7a. Owing to this pivotal movement the arm 89 engages with the projection 90, and the projection 90 and thus the latching plate 53 are moved in a direction opposite to the arrow B. As a result of this movement the button 6 is unlatched and moves in a direction opposite to the arrow C. This movement causes the slide 64 to be returned from the first position to the second position, while owing to engagement of the rib 75 with the rod 84 this rod is moved from the first to the second position, shown in FIG. 4a. Thus, the guide element 76 is unlatched indirectly, so that the guide element is moved from the first position to the second position by the force exerted by the spring 82. As already described with reference to FIG. 4a, the switching element 85 cannot be actuated in the second position. The resetting (release) of the play button 6 results in the winding spindle 28 no longer being driven and the pressure roller 23 being positioned at some distance from the capstan 85 owing to the switching mechanism, not shown, between said button, the normal-mode idler 51 and the pressure roller 23. For the construction of this switching mechanism reference is made to the previously mentioned Netherlands patent application No. 8006257, to which U.S. patent application Ser. No. 317,680 filed Nov. 2, 1981 corresponds.

A situation similar to that described in the foregoing occurs if the button 7 for fast forward winding is depressed. In that case the fast-mode idler wheel 42 is coupled to the gear-wheel 29 by the switching mechanism, so that the gear-wheel 29 is no longer driven by the friction coupling but is coupled directly to the winding spindle 28. During fast winding a rapid disengagement of the drive system is required. This disengagement is obtained in the same way as described in the foregoing, the button 7 then being unlatched, as is shown in FIG. 7a, resulting in the button 7 being reset by the disengagement of the fast-mode idler wheel 42 from the gear-wheel 29.

As already stated above, the actuating portions of the cams 94 and 95 are situated at different distances from the axis of the spindle 96. If the fast-rewind button 8 is depressed, the disk 92 will pivot in a direction opposite to the arrow H, so that the cam 95 presses against the lever 50. The arrangement of the actuating portion of the cam 95 at a smaller radial distance from the axis of the spindle 96 than the actuating portion of the cam 94 ensures that, despite the smaller distance of the cam 95 from the pivotal axis 49a, a torque is exerted on the lever 50 which is substantially equal to that exerted when the cam 94 presses against the lever 50. This is of great importance, because it ensures that, also when the winding spindle 27 is stationary when the end of the magnetic tape is reached, the free end 87 moves out of the first path to follow the second path, so that the switching element is actuated. Actuation of the switching element 85 then results in the button 8 being unlatched, which unlatching results in the gear-wheel 42 being disengaged from the gear-wheel 32. Thus, the device 108 is capable of disengaging the drive system in the same way both during rotation of the component 92 in a first and in a second direction.

It is to be noted that, in a manner as described in the said Netherlands patent application No. 8006257 to which U.S. patent application Ser. No. 317,680 filed Nov. 2, 1981 corresponds brakes, not shown, are actuated when the drive is disengaged, so that the reel discs 25 and 26 are stopped. Moreover, the head slide 19 may be moved away from the cassette 16. Furthermore it is to be noted that it is alternatively possible to pivot the lever 50 in a direction opposite to the arrow J by a spring instead of the force of gravity.

It is to be noted that, instead of the mechanically operating switching element 85, the free end 87 of the lever 50 may also actuate an electrically operating switch, which directly or through a solenoid disengages the drive when the component 91 is stationary. It is emphasized that by means of the device described it is possible to change over the drive system, for example by reversing the direction of rotation of the motor 33 upon actuation of the switching element 85 by means of an electrical polarity change. This may be of advantage if by means of the apparatus a magnetic tape is recorded or played back in two directions of transport (so-called "reverse operation"). Finally, it is to be noted that the device for switching the drive system as described in the foregoing may also be used in other equipment in which a rotary component may stop during operation of the apparatus.

Examples of this are generally apparatus with a winding or unwinding function. Finally, it is to be noted that the device for switching a drive system as described in the foregoing is also suitable as an accessory for such equipment, in order to provide a switching facility for such equipment.

What is claimed is:

1. A recording and/or playback apparatus comprising a drive system for transporting a recording medium, a component which rotates in response to transport of the medium, and a device for changing over the drive system upon stopping of rotation of the component, said device comprising a lever having an actuating portion, an actuating element frictionally coupled to said component and arranged to exert a torque on the lever when the component rotates, means for imparting reciprocating movement to the lever during operation of the drive system, said lever and means arranged such that during said movement said portion follows a first path when said torque is exerted, and follows a second path in the absence of said torque, said a switching element for changing over said drive, arranged to be actuated by reciprocating movement of said lever portion along said second path, characterized in that said actuating element comprises at least one cam arranged to engage said lever as a result of pivoting of the actuating element responsive to rotation of the component, said lever sliding along said cam during reciprocation, and the device includes a guide element for guiding said lever portion along said first and second paths during reciprocation.

2. An apparatus as claimed in claim 1, characterized in that the lever comprises a profiled portion on one side, which profiled portion engages the guide element during movement of the actuating portion of the lever along said first path.

3. An apparatus as claimed in claim 2, characterized in that the side lever remote from the profiled portion is substantially straight over at least the portion which engages the guide element.

4. An apparatus as claimed in claim 1, 2, or 3, characterized in that the guide element has an opening for passage of the lever therethrough, the lever being guided by opposite walls of said opening.

5. An apparatus as claimed in claim 4, characterized in that the guide element is moveable between two positions; in the first position, the actuating portion of the lever is guided along the first or second path respectively in response to said actuating element; and in the second guide element position, the actuating portion of the lever is guided along a third path in which the actuation portion of the lever is clear of the switching element.

6. An apparatus as claimed in claim 5, characterized in that said device comprises a positioning element connected to the frame of the apparatus through a friction coupling, movable between two positions, and means for moving the positioning element from the first to the second positioning element positions responsive to movement of the guide element to the guide element second position, in said second positioning element position said element guiding said lever along a path in which said actuating portion is clear of said switching element.

7. An apparatus as claimed in claim 6, characterized in that said device comprises a latching element which latches the guide element in the first position, said latching element being arranged to be engageable by the switching element so that upon actuation of the switching element by said lever actuating portion, the guide element is unlatched and movement into the second guide element position is enabled.

8. An apparatus as claimed in claim 5, characterized in that said device comprises a latching element which latches the guide element in the first position, said latching element being arranged to be engageable by the switching element so that upon actuation of the switching element by said lever actuating portion, the guide element is unlatched and movement into the second guide element position is enabled.

9. An apparatus as claimed in claim 8, characterized in that the actuating element is pivotably mounted and comprises two cams, arranged for engaging said lever respectively for opposite directions of rotation of said component; said lever is pivotable abut an axis for movement responsive to engagement by either of said cams; and one of said cams is disposed at a greater distance from said lever pivot axis than the other cam, and is disposed at a greater distance from the pivotal axis of the actuating element, thereby enabling exertion of the same torque on said lever for either direction of component rotation.

10. An apparatus as claimed in claim 7, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of the same torque on said lever for either direction of component rotation.

11. An apparatus as claimed in claim 6, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

12. An apparatus as claimed in claim 5, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

13. An apparatus as claimed in claim 2, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

14. An apparatus as claimed in claim 1, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

15. A mechanism for actuating a function in response to stoppage of rotation of a rotating component, comprising a drive system, a component mounted for rotation about an axis, and a device for actuating a function upon stoppage of rotation of the component, said device comprising a lever having an actuating portion, an actuating element frictionally coupled to said component and arranged to exert a torque on the lever when the component rotates, means driven by said drive system for imparting reciprocating movement of the lever during operation of the drive system, said lever and means arranged such that during said movement said portion follows a first path when said torque is exerted, and follows a second path in the absence of said torque, and a switching element for actuating said function, arranged to be actuated by reciprocating movement of said lever portion along said second path, characterized in that said actuating element comprises at least one cam arranged to engage said lever as a result of pivoting of the actuating element responsive to rotation of the component, said lever sliding along said cam during reciprocation, and the device includes a guide element for guiding said lever portion along said first and second paths during reciprocation.

16. A mechanism as claimed in claim 15, characterized in that the lever comprises a profiled portion on one side, which profiled portion engages the guide element during movement of the actuating portion of the lever along said first path.

17. A mechanism as claimed in claim 16 or 15, characterized in that the guide element has an opening for passage of the lever therethrough, the lever being guided by opposite walls of said opening.

18. A mechanism as claimed in claim 15, characterized in that the guide element is moveable between two positions; in the first position, the actuating portion of the lever is guided along the first or second path respectively in response to said actuating element; and in the second guide element position, the actuating portion of the lever is guided along a third path in which the actuation portion of the lever is clear of the switching element.

19. A mechanism as claimed in claim 18, characterized in that said device comprises a positioning element connected to the frame of the apparatus through a friction coupling, movable between two positions, and means for moving the positioning element from the first to the second positioning element positions responsive to movement of the guide element to the guide element second position, in said second positioning element position said element guiding said lever along a path in which said actuating portion is clear of said switching element.

20. An apparatus as claimed in claim 19, characterized in that said device comprises a latching element which latches the guide element in the first position, said latching element being arranged to be engageable by the switching element so that upon actuation of the switching element by said lever actuating portion, the guide element is unlatched and movement into the second guide element position is enabled.

21. An apparatus as claimed in claim 18, characterized in that said device comprises a latching element which latches the guide element in the first position, said latching element being arranged to be engageable by the switching element so that upon actuation of the switching element by said lever actuating portion, the guide element is unlatched and movement into the second guide element position is enabled.

22. A mechanism as claimed in claim 20, characterized in that the actuating element is pivotably mounted and comprises two cams, arranged for engaging said lever respectively for opposite directions of rotation of said component, said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

23. A mechanism as claimed in claim 18, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

24. A mechanism as claimed in claim 17, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

25. A mechanism as claimed in claim 15, characterized in that the actuating element is pivotably mounted and comprises two cams, arranged for engaging said lever respectively for opposite directions of rotation of said component; said lever is pivotable about an axis for movement responsive to engagement by either of said cams; and one of said cams is disposed at a greater distance from said lever pivot axis than the other cam, and is disposed at a greater distance from the pivotal axis of the actuating element, thereby enabling exertion of a same torque on said lever for either direction of component rotation.

* * * * *

UNITED STATES PATENT AND TRADEMARK OFFICE
CERTIFICATE OF CORRECTION

PATENT NO. : 4,437,626
DATED : March 20, 1984
INVENTOR(S) : GHISLANUS M.A.M. ALDENHOVEN It is certified that error appears in the above—identified patent and that said Letters Patent is hereby corrected as shown below:

Claim 3, line 2, (Col. 12, line 5) change "side lever" to --lever side--

Signed and Sealed this

Twenty-sixth Day of June 1984

[SEAL]

Attest:

GERALD J. MOSSINGHOFF

Attesting Officer

Commissioner of Patents and Trademarks